Oct. 26, 1965     G. A. BILOCQ     3,214,000
FEED REGULATING APPARATUS FOR LOGS OR THE LIKE
Filed Jan. 16, 1964     2 Sheets-Sheet 1
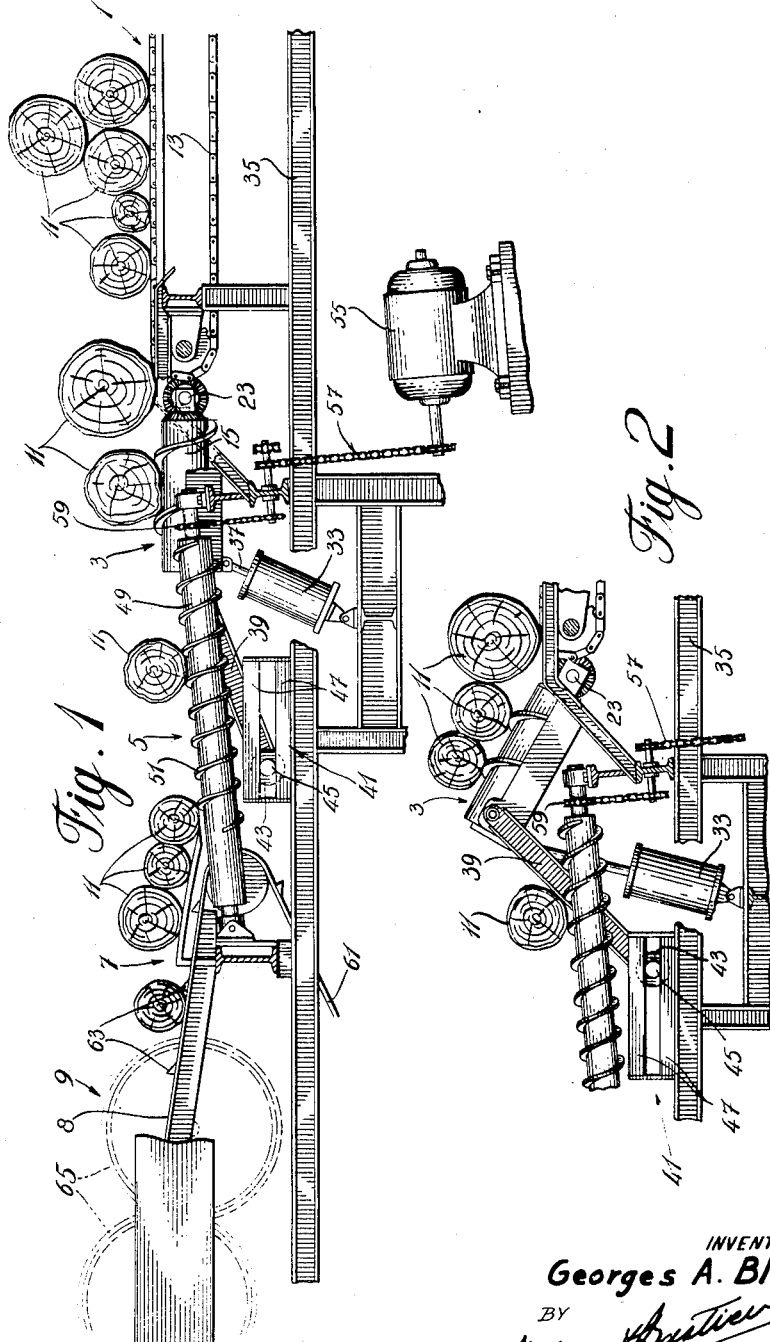
INVENTOR
Georges A. BILOCQ
BY
ATTORNEYS

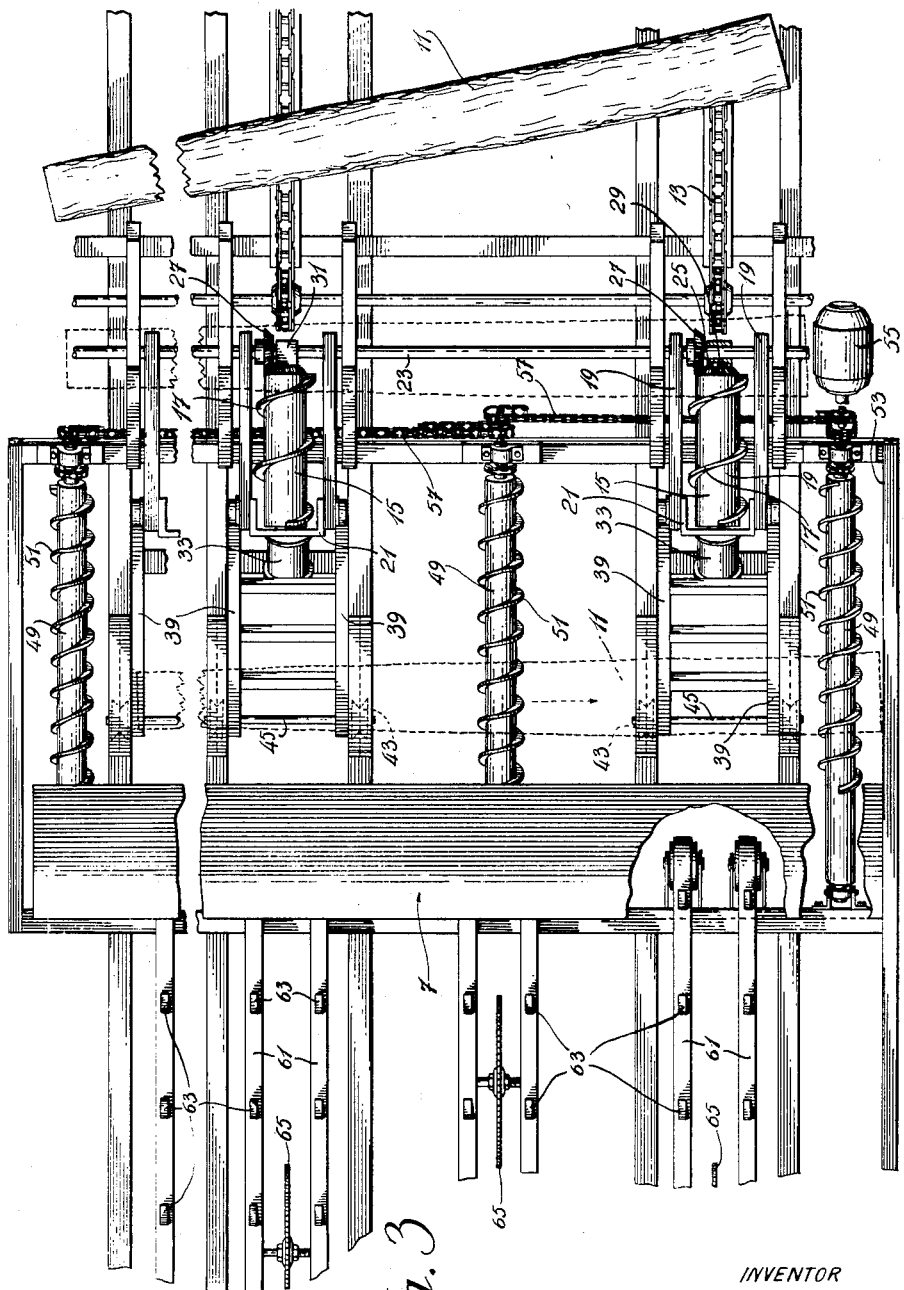

United States Patent Office 3,214,000
Patented Oct. 26, 1965

3,214,000
FEED REGULATING APPARATUS FOR LOGS
OR THE LIKE
Georges A. Bilocq, Plessisville, Quebec, Canada, assignor to Forano Limited, Plessisville, Quebec, Canada
Filed Jan. 16, 1964, Ser. No. 338,067
7 Claims. (Cl. 198—33)

The present invention relates to an apparatus for feeding logs to an operational machine under controlled feed conditions.

More specifically, the invention relates to a machine which will straighten and align logs and control the flow thereof prior to feeding into a further machine.

A main object of the invention resides in the provision of such an apparatus which will considerably reduce the requirement for skilled or unskilled labour in feeding an operational machine such, for instance, as a multiple saw slasher adapted to cut branchless tree trunks into standard size logs as used, particularly, in the paper making industry.

A further object of the invention lies in providing such an apparatus as aforedescribed which can be operated by only one man who will further not be required to handle the material, thus removing much of the accident hazards.

A still further object of the invention consists in the provision of a machine of the above type which is quite simple to operate and will not require the constant presence of a skilled person as it may be operated by someone completely unlearned of the mechanism thereof.

Yet another object of the invention is to provide a log feeding machine made of simple parts which can be manufactured at low cost and which is not likely to present any difficult maintenance problems.

The above mentioned objects of the invention are attainable in an apparatus made according to the invention and used in the regulation of the feed of logs or the like to an operational machine comprising: a plurality of operatively aligned independently driven travelling conveyors including a log receiving conveyor over which logs are randomly discharged, a retarding conveyor, mounted at the terminal end of the receiving conveyor, for regulating the rate of feed of logs from the receiving conveyor, an aligning conveyor mounted at the terminal end of the retarding conveyor, adapted to dispose one end of said logs in alignment and further comprising an upwardly inclined smooth apron plate mounted at the terminal end of the aligning conveyor and adapted to cause straightening of the logs both by the pushing action of the aligning conveyor and by gravity, the apron plate discharging logs at the inlet end of the said operational machine.

Preferably, the retarding travelling conveyor is formed of a plurality of parallel rollers arranged with the longitudinal axis thereof in the direction of movement of the logs; the rollers each having a helical ridge projecting from its outer surface to cause advancement of the logs and said rollers being pivoted about an axis transverse to the direction of movement of the logs. Preferably again, the rollers are individually operated in pivotal motion by jacks, one for each roller.

A better understanding of the invention will be had from the following description of a preferred embodiment of the invention, having reference to the annexed drawing, wherein:

FIG. 1 is a side elevation view of an apparatus made according to the invention;

FIG. 2 is a side elevation view of part of the machine of FIG. 1 showing the retarding conveyor in a retarding position;

FIG. 3 is a plan view of the apparatus of the invention.

Generally, the apparatus of the invention comprises a receiving conveyor 1 over which logs 11 are adapted to be randomly discharged. Receiving conveyor 1 feeds into a retarding conveyor 3 which in turn sends logs 11 over the aligning conveyor 5 which pushes the logs onto a log straightening apron plate 7 whence they are directed onto a gripping conveyor 8 which directs them to the multiple saw slasher 9.

Receiving conveyor 1 is preferably formed of a series of longitudinal parallel endless chains 13 arranged on a transverse structure of any known type. At the terminal end of conveyor 1, logs 11 are discharged onto a plurality of parallel rollers 15 arranged with the longitudinal axes thereof located in the direction of movement of logs 11. Rollers 15 each have a helical ridge 17 projecting from its outer surface. The pitch of the ridge as well as the diameter of rollers 15 should be so chosen as to prevent any appreciable lateral displacement as it is not the purpose of rollers 15 to laterally displace the logs but displace them longitudinally in the general direction of movement thereof.

As shown, rollers 15 are mounted within a frame formed of two lateral members 19 joined at one end by an end piece 21 and at the other end by a transverse common shaft 23 extending through the frame of all rollers 15.

Rollers 15 are mounted for axial rotation on end pieces 21 and are each provided, at the opposite end, with a conical gear 25 in mesh with a second conical gear 27 mounted at right angle thereto and secured to common shaft 23. An axial pin 29 at the said end of rollers 15 is received in a sleeve 31 freely mounted on common shaft 23 to hold roller 15 and ensure proper meshing of gears 25 and 27.

A motor, not shown, causes rotation of shaft 23 and consequently, simultaneous rotation of all rollers 15. A jack 33 pivotally mounted on frame 35 has the piston rod 37 thereof connected to the corresponding end piece 21 of a roller 15, there being a jack 33 for each roller 15. Jacks 33 are preferably, although not necessarily, individually operated for a purpose to be determined later.

Each roller frame is provided with a substantially flat ramp structure 39, one end of which is pivotally connected to the lateral members 19 of the corresponding frame while the other end is mounted for sliding action in a horizontal plane in a guiding frame 41. This may be achieved in any known manner such as by having wheels 43, secured at the ends of an axle 45 of ramp structure 39, displaceable in suitable races 47 of guiding frame 41.

As said previously, an aligning conveyor 5 follows the retarding conveyor 3. The said aligning conveyor is formed of a series of parallel inclined rollers 49, quite similar to rollers 15, and downwardly inclined in the direction of movement of the logs. As with rollers 15, rollers 49 are also provided with helical ridges 51 projecting radially from the outer surface thereof. It will however be noted that in the case of rollers 49, the pitch of the helical ridges is smaller and so is the diameter of the rollers themselves. By driving the said rollers 49 at a suitable speed, logs 11 will not only be displaced forwardly but also laterally in the direction of the lower part of FIG. 3. An arresting plate 53 provided on the side of the conveyor towards which the logs are laterally driven, ensures that one end of all logs become in alignment.

The simultaneous drive of all rollers 49 is obtained through a motor 55 connected to a chain assembly 57 which, in turn, is connected to suitable sprockets 59 at one end of rollers 49.

From the downwardly inclined aligned conveyor 5, logs 11 are pushed towards an upwardly inclined smooth transverse apron plate 7 mounted at the terminal end of the said aligned conveyor. From the stationary apron plate 7, logs 11 are discharged onto a gripping conveyor 8 formed of a series of endless belts 61 provided along their upper surface with properly oriented triangular grippers 63 which drive logs 11 towards the multiple saw slasher 9. As is known, slasher 9 is formed of several individual saws 65 mounted in staggered arrangement as seen in FIG. 1.

The operation of the apparatus will now be described.

Logs 11 are discharged onto the receiving conveyor 1 and are driven forwardly towards the retarding conveyor 3. At this time, should there be an accumulation of logs on the aligning conveyor 5 or at other locations ahead of the retarding conveyor, jacks 33 are operated to lift rollers 15, pivoted to common shaft 23 through lateral members 19, thus hindering and slowing forward movement of the logs. The extent of movement of jacks 33 may be such that movement of logs 11 will be completely stopped.

It should be pointed out at this time that by individually operating jacks 33, it is possible to cause a certain straightening of the logs.

Logs 11 leave retarding conveyor 3 and slide on ramp structures 39 to be discharged on the aligning conveyor 5. The latter pushes the logs towards the apron plate 7 at the same time because of the presence of other logs on ramp 7, causing straightening of the logs. Indeed, it will be understood that if one end of a log 11 reaches apron 7 before the other end, the log will not move up the ramp before the other end has reached it. This result will be further enhanced by the presence of other logs on the ramp 7.

Movement of the logs 11 from apron plate 7 to the gripping conveyor 8 will only occur when there are enough of such logs on the ramp and they are pushed on the conveyor 8 by further incoming logs on the aligning conveyor 5.

It will of course be understood that various modifications may be made to the above described apparatus withing the spirit of the invention and that the scope thereof should only be construed from the appended claims.

I claim:

1. An apparatus for regulating the feed of logs or the like to an operational machine comprising:
    (a) a horizontal log receiving travelling conveyor over which logs are randomly discharged;
    (b) a retarding travelling conveyor, pivotally mounted at one end at the terminal end of said receiving conveyor, for regulating the feed of logs from said receiving conveyor;
    (c) means pivoting said retarding conveyor vertically to retard or stop advancement of the logs;
    (d) an aligning conveyor, mounted at the terminal end of said retarding conveyor, adapted to dispose one end of said logs in alignment, and
    (e) an upwardly inclined smooth apron plate mounted at the terminal end of the aligning conveyor, adapted to cause straightening of the logs both by the pushing action of said aligning conveyor and by gravity, said apron plate discharging logs at the inlet end of said operational machine.

2. An apparatus as claimed in claim 1, wherein said retarding conveyor is formed of a plurality of parallel rollers arranged with the longitudinal axes thereof in the direction of movement of said logs; said rollers each having a helical ridge projecting from its outer surface to cause advancement of the logs and said rollers being pivoted about an axis transverse to said direction of movement.

3. An apparatus as claimed in claim 2, wherein said means pivoting said retarding conveyor is formed of individually operated jacks, one for each roller.

4. An apparatus for regulating the feed of logs or the like to an operational machine comprising:
    (a) a horizontal log receiving travelling conveyor over which logs are randomly discharged;
    (b) a retarding travelling conveyor formed of a plurality of parallel rollers arranged with the longitudinal axes thereof in the direction of movement of said logs; said rollers each having a helical ridge projecting from the outer surface thereof to cause advancement of the logs, and said rollers being pivotally mounted at one end thereof at the terminal end of said receiving conveyor for vertical rotation about an axis transverse to the direction of movement of the logs whereby to retard or stop advancement of said logs;
    (c) means pivoting said rollers;
    (d) an aligning conveyor, downwardly inclined in the direction of movement of the logs, mounted at the terminal end of said retarding conveyor, said aligning conveyor adapted to dispose one end of said logs in alignment;
    (e) an upwardly inclined smooth apron plate mounted at the terminal end of the aligning conveyor, adapted to cause straightening of the logs both by the pushing action of said aligning conveyor and by gravity, said apron plate discharging logs at the inlet end of said operational machine.

5. An apparatus as claimed in claim 4, wherein said means pivoting said rollers is formed of individually operated jacks, one for each roller.

6. An apparatus as claimed in claim 4, wherein said aligning conveyor is formed of a series of parallel rollers arranged with the longitudinal axes thereof in the direction of movement of said logs; said rollers each having a helical ridge projecting from its outer surface adapted to cause lateral displacement of the logs and a vertical arresting plate along the side of said aligning conveyor towards which the logs are displaced to cause alignment of the logs along the ends corresponding to said plate.

7. An apparatus as claimed in claim 6, wherein the ends of the retarding conveyor parallel rollers opposite the pivoted ends thereof are connevted to one end of flat ramps the other ends of which are mounted between the parallel rollers of the aligning conveyor for movement in a horizontal plate whereby the inclination of said ramps follows that of said retarding conveyor rollers but in reverse direction.

References Cited by the Examiner
UNITED STATES PATENTS

| | | | |
|---|---|---|---|
| 2,656,907 | 10/53 | Page | 198—46 X |
| 2,827,150 | 3/58 | Eaton | 198—51 X |
| 2,863,551 | 12/58 | Bilocq | 198—29 |

SAMUEL F. COLEMAN, *Primary Examiner.*

EDWARD A. SROKA, *Examiner.*